E. A. REICHELT.
COMBINED CULTIVATOR AND SEED AND FERTILIZER SOWING IMPLEMENT.
APPLICATION FILED NOV. 15, 1917.

1,263,111.

Patented Apr. 16, 1918.

INVENTOR
E. A. Reichelt

UNITED STATES PATENT OFFICE.

ERNEST A. REICHELT, OF LORQUON, VICTORIA, AUSTRALIA.

COMBINED CULTIVATOR AND SEED AND FERTILIZER SOWING IMPLEMENT.

1,263,111.  Specification of Letters Patent.  Patented Apr. 16, 1918.

Application filed November 15, 1917. Serial No. 202,193.

*To all whom it may concern:*

Be it known that I, ERNEST ALBERT REICHELT, a subject of the King of Great Britain and Ireland, and a resident of the post-town of Lorquon, in the parish of Lorquon, county of Lowan, State of Victoria, Commonwealth of Australia, (whose post-office address is in the said post-town of Lorquon), have invented a certain new and useful Improved Combined Cultivator and Seed and Fertilizer Sowing Implement, of which the following is a specification.

This invention relates to the cultivation of land and the sowing of seed and fertilizing manure in the soil after cultivation.

Hitherto it has been the usual practice to first employ a cultivating implement to break up clods of earth and prepare the soil for sowing after which the seed and fertilizer are sown either broadcast or by means of a drill or other sowing implement. Finally a harrow is passed over the soil to cover the seed. It will thus be seen that two distinct operations are necessary in cultivating the land and sowing the seed, and consequently considerable time and labor are entailed.

The object of the present invention is to combine the operations of cultivating and sowing by providing a cultivator of the spring tooth variety with means for sowing seed and fertilizer (if this is required) in the furrows formed by the teeth or tines of the implement. According to the invention preferably four rows of spring tines are employed and to each tine of either the two back rows, the two middle rows, or the two front rows or to any two or more rows, I attach a hoe or sowing tube through which the seed falls to the ground behind the tine. The lower end of each tine passes inside its respective hoe and the hoe is held to the tine by a single bolt which also passes through and holds the detachable point of the tine in place. This method of attachment is simple and convenient and forms a feature of the invention.

Referring to the drawings which form a part of this specification:—

Figure 1:
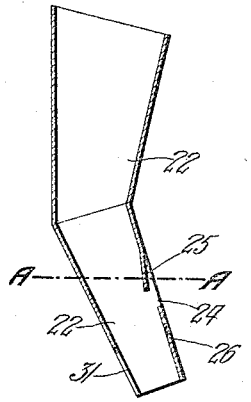

Figure 1 is a vertical section of a hoe or sowing tube according to the invention.

Figure 2:
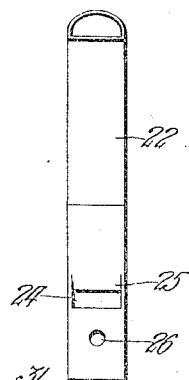
Figure 3:
Figure 4:
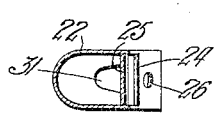
Figure 5:
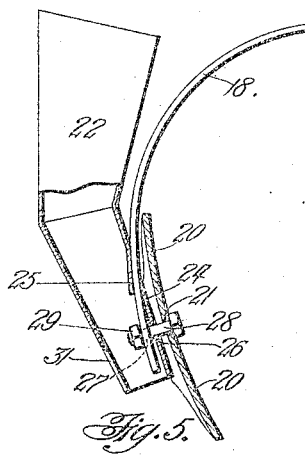
Figure 6:
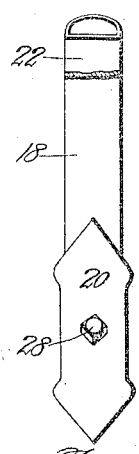
Figure 7:
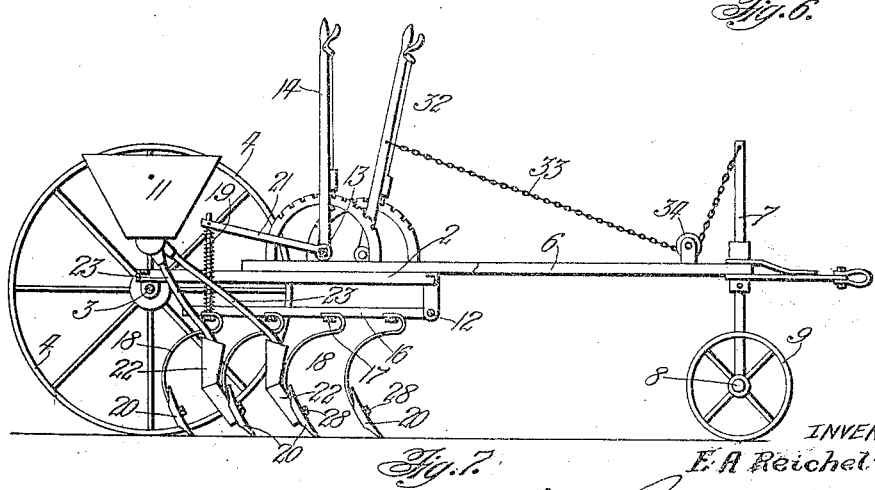

Fig. 2 is a front view of Fig. 1.
Fig. 3 is a rear view of Fig. 1.
Fig. 4 is a section taken on line A—A of Fig. 1.
Fig. 5 is a part sectional side view showing a hoe, a tine, and a detachable point connected together in accordance with the invention.
Fig. 6 is a front view of Fig. 5.
Fig. 7 is a side elevation of an implement embodying the features of my invention. The hoes are shown attached to the two middle rows of tines as is preferred but they may be attached to any other rows if so desired.

The implement includes a main framework 2 (Fig. 7) having an axle 3 upon which are mounted supporting wheels 4. Connected to the framework and converging forwardly therefrom are draft bars 6. Connected to the leading end of the draft bars is a vertical king pin 7 which supports at its lower end a short front axle 8 upon the ends of which are mounted a pair of small leading wheels 9. Supported by the frame work is a seed and fertilizer box 11 which extends laterally across the implement. The framework is also provided with a front lateral member 12 and cross bar 13 to which is secured the lower end of a hand lever 14 which is controlled by a suitable pawl and quadrant mechanism.

Pivoted to the front lateral member 12 of the framework are the longitudinal members 16 of a series of tine supporting frames. These frames are also provided with cross members 17 to which the curved tines or teeth 18 are attached. Suitable spring connections 19 extend between the rear of these frames and arms 21 fixed to the cross bar 13 carrying the hand lever 14. By the operation of this hand lever the required degree of pressure may be exerted on the tines.

The tines are arranged preferably in four rows across the implement the tines of each row being suitably staggered in relation to the other rows. Each tine is provided at its lower end with a detachable point 20 through which is a bolt hole 21.

Attached to selected tines preferably to those of the second and third rows are hoes or sowing tubes 22. The upper ends of each of these hoes by means of feed tubes 23 are in communication with the seed and fertilizer contained in the box 11. The hoes or sowing tubes are secured to the back of their respective tines as follows:—The front wall of the hoe or tube is preferably made flat as shown to bed evenly against the back of the tine and through it is formed an opening or slot 24 the upper lip of which is backset as at 25 to accommodate the curved portion of the tine which passes through the slot and extends downwardly inside the tube as seen in Fig. 5. The tube is provided beneath the slot 24 with a bolt hole 26. A corresponding bolt hole 27 is formed through that portion of the tine which is within the sowing tube. The detachable points 20 of the tines are secured to the front of the hoes or tubes by passing a bolt 28 through the holes in the detachable point, the tine and the sowing tube and threading a nut 29 onto the inner end of the bolt. The opening 31 in the back of the hoe facilitates the introduction of the nut and presents a clear passage for the falling seed or manure. It will be seen from the foregoing that the hoe, the tine and the detachable point are securely united by the bolt 28 and a simple and ready means of connecting or dismantling the parts is provided.

An additional hand lever 32 may be provided, to this is attached the rear end of a chain 33 which passes over a roller 34 carried by the front of the framework and has its front end connected to the top of the king pin 7 upon which the front of the framework is vertically adjustable. By operating the hand lever 32 the front of the framework may be raised or lowered and the depth of cut of the tines thus regulated as desired.

As the machine moves forwardly the tines break up and prepare the soil for the seed which is dropped into the furrows by the sowing tubes thus eliminating the subsequent operation of drilling which is necessary when an ordinary cultivator is employed. If the sowing tubes are arranged on the second and third rows as shown the front row of tines acts merely to prepare the soil while the tines of the third row cover the seed sown by the hoes of the second row and the rear row of tines covers the seed sown by the hoes of the third row.

Having now described my invention what I claim as new and desire to secure by Letters Patent is:—

1. In a combined cultivating and sowing implement, a series of spring tines arranged in four staggered rows across the machine, hoes or sowing tubes attached to the rear of the tines of the two middle rows, each of said hoes having a slotway in its front face to accommodate the lower end of its respective tine and a seed box in communication with each of the hoes.

2. In a combined cultivating and sowing implement, a series of spring tines arranged in four staggered rows across the machine, hoes or sowing tubes attached to the rear of selected tines, each of said hoes having a slotway to accommodate the lower end of its respective tine a bolt passing through the lower end of the tine and the hoe beneath said slotway, and a seed box in communication with each of the hoes.

3. In a combined cultivating and sowing implement, a series of spring tines arranged in four rows across the implement, hoes or sowing tubes attached to the rear of selected tines, each of said hoes having a slotway in its front face to pass the curved portion of its respective tine which passes inside the hoe, a detachable point secured to the front of each hoe, a seed box mounted on the implement frame and feed tubes leading from the seed box to each of the hoes.

4. In a combined cultivating and sowing implement, the combination with a spring tine having a detachable point, of a hoe or sowing tube secured to the rear of said tine, said hoe having a slotway in its front face through which the lower end of the tine passes, a backset upper lip to said slotway and means for attaching the hoe, the tine and the detachable point together.

5. In a combined cultivating and sowing implement, the combination with a spring tine having a detachable point, of a hoe or sowing tube secured to the rear of said tine said hoe having a flat front face and a slotway in said face through which passes the lower end of the tine, a backset upper lip to said slotway, and a bolt passing through bolt holes in the tine, the hoe and the detachable point, beneath said slotway to fasten the three parts together.

6. In a combined cultivating and sowing implement, the combination with a spring tine having a detachable point, of a hoe secured to the rear of said tine, said hoe having a flat front face, a slotway in said face to pass the tine and an opening in the back of the hoe at its lower end, a backset upper lip to said slotway, a bolt passing through the tine, the hoe, and the detachable point, and a nut threaded on to said bolt within the hoe and adjacent the opening in the back thereof.

7. In a combined cultivating and sowing implement the combination of a frame-work having supporting wheels, forwardly extending draft bars attached to the frame work, a king pin vertically adjustable in relation to the front of the draft bars, leading wheels mounted at the lower end of said king pin, a series of spring tines arranged in four staggered rows across the machine, a hoe or sowing tube attached to each of the tines of the two middle rows, said hoes each having a slotway in their front face to pass the lower end of the respective tine, a detachable point attached to the front of each hoe, a seed box mounted on the framework, feed tubes leading from the seed box to each of the hoes, means for adjusting the pressure on the tines and means for raising and lowering the front of the frame-work to adjust the depth of cut of the tines.

In testimony whereof I affix my signature.

E. A. REICHELT.